(12) United States Patent
Zähe

(10) Patent No.: US 10,774,849 B1
(45) Date of Patent: Sep. 15, 2020

(54) PROPORTIONAL FLUID FLOW CONTROL VALVE HAVING A BUILT-IN CHECK VALVE AND CONFIGURED TO GENERATE A PILOT SIGNAL

(71) Applicant: Sun Hydraulics, LLC, Sarasota, FL (US)

(72) Inventor: Bernd Zähe, Sarasota, FL (US)

(73) Assignee: Sun Hydraulics, LLC, Sarasota, FL (US)

( * ) Notice: Subject to any disclaimer, the term of this patent is extended or adjusted under 35 U.S.C. 154(b) by 73 days.

(21) Appl. No.: 16/246,921

(22) Filed: Jan. 14, 2019

Related U.S. Application Data

(60) Provisional application No. 62/777,558, filed on Dec. 10, 2018.

(51) Int. Cl.

| F15B 11/00 | (2006.01) |
|---|---|
| F16K 31/06 | (2006.01) |
| F15B 11/10 | (2006.01) |
| F15B 13/01 | (2006.01) |
| F15B 13/02 | (2006.01) |
| F15B 13/042 | (2006.01) |
| F16K 15/18 | (2006.01) |
| F15B 13/043 | (2006.01) |

(52) U.S. Cl.
CPC .......... *F15B 11/003* (2013.01); *F15B 11/10* (2013.01); *F15B 13/01* (2013.01); *F15B 13/027* (2013.01); *F15B 13/029* (2013.01); *F15B 13/043* (2013.01); *F15B 13/0422* (2013.01); *F16K 15/18* (2013.01); *F16K 31/06* (2013.01); *F15B 2211/30515* (2013.01); *F15B 2211/329* (2013.01)

(58) Field of Classification Search
CPC ......... F15B 11/00; F15B 11/003; F15B 11/10; F15B 13/01; F15B 13/027; F15B 13/0422; F15B 13/043; F16K 31/06
See application file for complete search history.

(56) References Cited

U.S. PATENT DOCUMENTS 7,921,880 B2   4/2011   Jackson et al.

*Primary Examiner* — Thomas E Lazo
*Assistant Examiner* — Daniel S Collins
(74) *Attorney, Agent, or Firm* — McDonnell Boehnen Hulbert & Berghoff LLP

(57) ABSTRACT

An example valve includes: a piston movable between a neutral position and an actuated position; a check poppet configured to be coupled to the piston, wherein in the neutral position, the check poppet is seated on a seat formed on an interior peripheral surface of the housing and blocks fluid at the first port; a solenoid actuator sleeve movable between an unactuated state and an actuated state, wherein in the actuated state, the solenoid actuator sleeve allows pilot fluid to apply a fluid force on the piston in a distal direction; and a feedback spring that applies a biasing force in a proximal direction on the piston against the fluid force, wherein the piston and the check poppet are configured to move axially to the actuated position based on a relationship between the fluid force and the biasing force.

20 Claims, 5 Drawing Sheets

600

```
┌─────────────────────────────────────────────────────────────┐
│ OPERATING A VALVE IN A FIRST STATE, WHERE THE VALVE         │
│ COMPRISES A FIRST PORT CONFIGURED TO BE FLUIDLY COUPLED TO  │
│ AN ACTUATOR, A SECOND PORT CONFIGURED TO BE FLUIDLY         │
│ COUPLED TO A TANK, A THIRD PORT CONFIGURED TO BE FLUIDLY    │
│ COUPLED TO A SOURCE OF FLUID, AND A FOURTH PORT CONFIGURED  │── 602
│ TO BE FLUIDLY COUPLED TO A PILOT PORT OF A LOAD-HOLDING     │
│ VALVE, WHERE IN THE FIRST STATE OF THE VALVE, THE FOURTH PORT│
│ IS FLUIDLY COUPLED TO THE SECOND PORT TO DRAIN THE PILOT PORT│
│ OF THE LOAD-HOLDING VALVE TO THE TANK                       │
└─────────────────────────────────────────────────────────────┘
                              │
                              ▼
┌─────────────────────────────────────────────────────────────┐
│ RECEIVING AN ELECTRIC SIGNAL ENERGIZING A SOLENOID COIL OF A│
│ SOLENOID ACTUATOR OF THE VALVE TO OPERATE THE VALVE IN A    │── 604
│ SECOND STATE                                                │
└─────────────────────────────────────────────────────────────┘
                              │
                              ▼
┌─────────────────────────────────────────────────────────────┐
│ RESPONSIVELY, CAUSING AN ARMATURE AND A SOLENOID ACTUATOR   │
│ SLEEVE COUPLED THERETO TO MOVE, THEREBY (I) COMPRESSING A   │
│ FEEDBACK SPRING TO INCREASE BIASING FORCE APPLIED BY THE    │
│ FEEDBACK SPRING ON A PISTON OF THE VALVE IN A PROXIMAL      │
│ DIRECTION, AND (II) OPENING A PILOT FLOW PATH TO ALLOW PILOT│
│ FLUID TO FLOW FROM THE THIRD PORT TO THE SECOND PORT,       │── 606
│ WHEREIN THE PILOT FLUID APPLIES A FLUID FORCE ON THE PISTON IN│
│ A DISTAL DIRECTION, AND WHEREIN THE PISTON MOVES TO A       │
│ PARTICULAR AXIAL POSITION DETERMINED BY A RELATIONSHIP      │
│ BETWEEN THE FLUID FORCE AND THE BIASING FORCE               │
└─────────────────────────────────────────────────────────────┘
                              │
                              ▼
┌─────────────────────────────────────────────────────────────┐
│ IN RESPONSE TO MOTION OF THE PISTON TO THE PARTICULAR AXIAL │
│ POSITION: (I) OPENING A MAIN FLOW PATH FROM THE THIRD PORT TO│
│ THE FIRST PORT WHILE BLOCKING FLUID PATH FROM THE FOURTH    │
│ PORT TO THE SECOND PORT, AND (II) OPENING A PILOT FLUID SIGNAL│── 608
│ PATH FROM THE THIRD PORT TO THE FOURTH PORT TO PROVIDE A    │
│ PILOT FLUID SIGNAL TO THE PILOT PORT OF THE LOAD-HOLDING    │
│ VALVE                                                       │
└─────────────────────────────────────────────────────────────┘
```

FIG. 6

PROPORTIONAL FLUID FLOW CONTROL VALVE HAVING A BUILT-IN CHECK VALVE AND CONFIGURED TO GENERATE A PILOT SIGNAL

CROSS REFERENCE TO RELATED APPLICATION

The present application claims priority to U.S. Provisional patent application Ser. No. 62/777,558, filed on Dec. 10, 2018, and entitled "Proportional Fluid Flow Control Valve having a Built-In Check Valve and Configured to Generate a Pilot Signal," the entire contents of which are herein incorporated by reference as if fully set forth in this description.

BACKGROUND

In conventional hydraulic systems, pressurized hydraulic fluid is supplied from a pump to a cylinder (actuator) and hydraulic fluid flows out of the actuator to a tank. The flow to the actuator and out of the actuator is controlled by a spool valve. The position of a spool within the spool valve controls the flow of the hydraulic fluid. When the spool valve is actuated, the spool moves to a certain position and controls the flow of hydraulic fluid both to and from the actuator.

The construction of the four way spool valve is such that a given position of the spool determines the 'flow in' and the 'flow out' restriction sizes. Thus, metering-in and metering-out are coupled, and a certain restriction size on the inlet corresponds to a certain restriction size on the outlet. Therefore, the valve has one degree of freedom, and can control either the speed of the actuator or the pressure in one chamber of the actuator but not both. Thus, a spool valve can provide for speed control but it cannot achieve energy saving potential at the same time.

Further, in the case of an overrunning load, which occurs when lowering a load with gravity assistance, for example, a spool valve is designed such that the outlet restriction is used to control the flow so as to prevent the load from falling at uncontrollable speeds. However, in other operating conditions, such as lifting a load, this restriction is not needed yet it is inherent in the design of the spool valve and causes energy loss.

Further, some spool valves are actuated via a pilot fluid signal. Particularly, a pressure reducing valve is added to the system and is configured to receive fluid from the pump and reduce the pressure level of the fluid before providing the pilot signal fluid having the reduced pressure level to the spool valve to move its spool. Having such a pressure reducing valve can increase the cost of the hydraulic system. Further, such a hydraulic system involves first reducing pressure level then controlling a stroke of the spool of the spool valve. Such configuration can lead to poor resolution and poor proportionality between a command signal to the pressure reducing valve and a position of the spool.

It may thus be desirable to have a hydraulic system that replaces the spool valve with two independently-controlled meter-in valves. It may also be desirable to have meter-in valves with a mechanical feedback to control stroke of a movable element rather than controlling pressure level. This way, the pressure reducing valve is eliminated from the system and enhanced flow resolution and proportionality can be achieved. It is with respect to these and other considerations that the disclosure made herein is presented.

SUMMARY

The present disclosure describes implementations that relate to a proportional fluid flow control valve having a built-in check valve and configured to generate a pilot signal.

In a first example implementation, the present disclosure describes a valve. The valve includes: (i) a housing comprising: (a) a first port, (b) a second port, (c) a third port, wherein the third port comprises a pilot cross-hole and an inlet flow cross-hole, and (d) a fourth port; (ii) a piston disposed in the housing and axially movable between a neutral position and an actuated position, wherein in the neutral position, the piston allows the fourth port to be drained to the second port; (iii) a check poppet disposed in the housing and configured to be coupled to the piston, wherein in the neutral position, the check poppet is seated on a seat formed on an interior peripheral surface of the housing and blocks fluid at the first port; (iv) a solenoid actuator sleeve comprising a chamber therein, wherein the solenoid actuator sleeve is axially movable between an unactuated state and an actuated state, wherein in the unactuated state, the solenoid actuator sleeve blocks the pilot cross-hole of the third port, and in the actuated state, the solenoid actuator sleeve is configured to allow the pilot cross-hole of the third port to be fluidly coupled to the second port and allow pilot fluid to apply a fluid force on the piston in a distal direction; and (v) a feedback spring disposed in the chamber within the solenoid actuator sleeve, wherein the feedback spring applies a biasing force in a proximal direction on the piston against the fluid force, wherein the piston and the check poppet are configured to move axially to the actuated position based on a relationship between the fluid force and the biasing force, and wherein in the actuated position: (a) the check poppet is unseated off the seat to fluidly couple the inlet flow cross-hole of the third port to the first port, and (b) the piston provides a pilot fluid signal path from the third port to the fourth port.

In a second example implementation, the present disclosure describes a hydraulic system including a source of fluid; a tank; an actuator having a first actuator port and a second actuator port; a load-holding valve having: (i) a load port fluidly coupled to the second actuator port, and (ii) a pilot port, wherein the load-holding valve is configured to allow fluid flow from the load port to the tank when a pilot fluid signal is provided to the pilot port; and a valve having (i) a first port fluidly coupled to the first actuator port, (ii) a second port fluidly coupled to the tank, (iii) a third port fluidly coupled to the source of fluid, wherein the third port comprises a pilot cross-hole and an inlet flow cross-hole, and (iv) a fourth port fluidly coupled to the pilot port of the load-holding valve. The valve comprises: (i) a piston that is axially movable between a neutral position and an actuated position, wherein in the neutral position, the piston allows the fourth port to be drained to the second port; (ii) a check poppet configured to be coupled to the piston, wherein in the neutral position, the check poppet is seated on a seat formed on an interior peripheral surface of a housing of the valve and blocks fluid at the first port of the valve; (iii) a solenoid actuator sleeve comprising a chamber therein, wherein the solenoid actuator sleeve is axially movable between an unactuated state and an actuated state, wherein in the unactuated state, the solenoid actuator sleeve blocks the pilot cross-hole of the third port, and in the actuated state, the solenoid actuator sleeve is configured to allow the pilot cross-hole of the third port to be fluidly coupled to the second port and allow pilot fluid to apply a fluid force on the piston in a distal direction; and (iv) a feedback spring disposed in the chamber within the solenoid actuator sleeve, wherein the feedback spring applies a biasing force in a proximal direction on the piston against the fluid force, wherein the piston and the check poppet are configured to move axially to the actuated position based on a relationship between the fluid force and the biasing force, and wherein in the actuated position: (a) the check poppet is unseated off the seat to form a main flow path that fluidly couples the inlet flow cross-hole of the third port to the first port and provide main flow to the first actuator port, and (b) the piston provides a pilot fluid signal path for the pilot fluid signal from the third port to the fourth port, which is fluidly coupled to the pilot port of the load-holding valve, to actuate the load-holding valve.

In a third example implementation, the present disclosure describes a method. The method includes: (i) operating a valve in a first state, wherein the valve comprises a first port configured to be fluidly coupled to an actuator, a second port configured to be fluidly coupled to a tank, a third port configured to be fluidly coupled to a source of fluid, and a fourth port configured to be fluidly coupled to a pilot port of a load-holding valve, wherein in the first state of the valve, the fourth port is fluidly coupled to the second port to drain the pilot port of the load-holding valve to the tank; (ii) receiving an electric signal energizing a solenoid coil of a solenoid actuator of the valve to operate the valve in a second state; (iii) responsively, causing an armature and a solenoid actuator sleeve coupled thereto to move, thereby (a) compressing a feedback spring to increase a biasing force applied by the feedback spring on a piston of the valve in a proximal direction, and (b) opening a pilot flow path to allow pilot fluid to flow from the third port to the second port, wherein the pilot fluid applies a fluid force on the piston in a distal direction, and wherein the piston moves to a particular axial position determined by a relationship between the fluid force and the biasing force; and (iv) in response to motion of the piston to the particular axial position: (a) opening a main flow path from the third port to the first port while blocking fluid path from the fourth port to the second port, and (b) opening a pilot fluid signal path from the third port to the fourth port to provide a pilot fluid signal to the pilot port of the load-holding valve.

The foregoing summary is illustrative only and is not intended to be in any way limiting. In addition to the illustrative aspects, implementations, and features described above, further aspects, implementations, and features will become apparent by reference to the figures and the following detailed description.

BRIEF DESCRIPTION OF THE FIGURES

The novel features believed characteristic of the illustrative examples are set forth in the appended claims. The illustrative examples, however, as well as a preferred mode of use, further objectives and descriptions thereof, will best be understood by reference to the following detailed description of an illustrative example of the present disclosure when read in conjunction with the accompanying Figures.

FIG. 6 is a flowchart of a method for operating a valve, in accordance with an example implementation.

DETAILED DESCRIPTION

Figure 1:
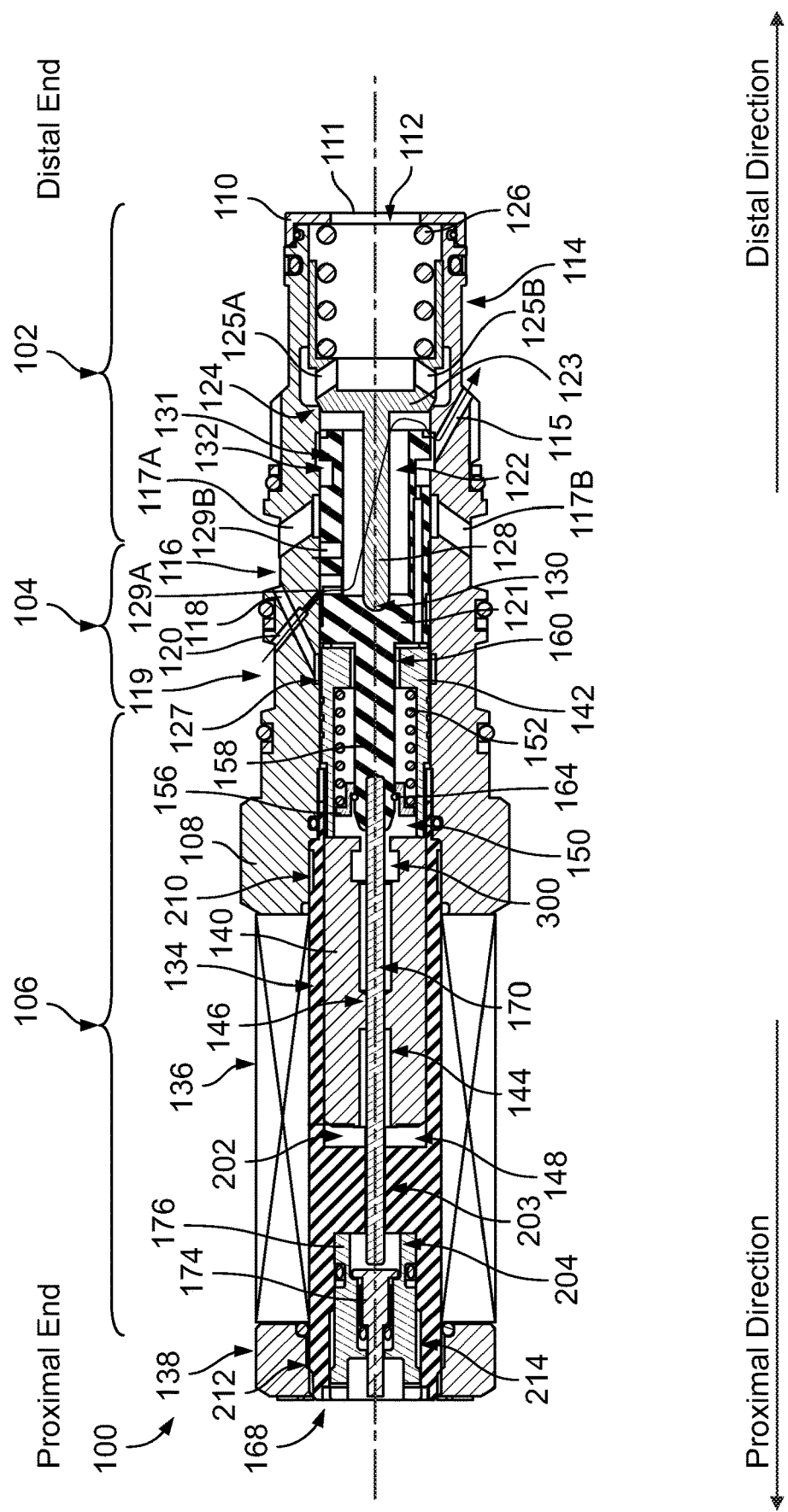
FIG. 1 illustrates a cross-sectional side view of a valve in an unactuated state, in accordance with an example implementation.

It may be desirable in hydraulic systems to independently control meter-in flow to an actuator and meter-out flow from the actuator. Independently controlling flow into and flow out of an actuator provides for a two degree of freedom system capable of controlling speed of the actuator as well as pressure in one of the chambers of the actuator, rendering the system capable of achieving a higher efficiency.

Further, in some conventional hydraulic systems where a spool valve is used to control both meter-in and meter-out flow, a pressure reducing valve is used in addition to the spool valve. The pressure reducing valve is configured to reduce pressure level of fluid received from a pump or other source of pressurized fluid, and then provides a pressure pilot fluid signal to the spool valve to move a spool within the spool valve. The pressure reducing valve adds to the cost of the hydraulic system. Further, such configuration having the pressure reducing valve involves controlling pressure level of the pilot signal to then control position of the spool. This configuration may lead to poor resolution and poor proportionality between a command signal to the pressure reducing valve and the position of the spool valve.

In example hydraulic systems, pilot-operated load-holding valves, such as counterbalance valves, can be used for handling a negative load of an actuator in a controlled manner. Counterbalance valves also hold a load in place in the case of a malfunction such as a hydraulic hose rupture or damage. The counterbalance valves generate a preload or back-pressure in a return line that acts against the main drive pressure so as to maintain a positive load, which therefore remains controllable.

A pilot-operated counterbalance valve is opened by a pressurized pilot line. To protect both directions of motion of an actuator against a negative load, a counterbalance valve may be assigned to each of the ports of the fluid receiving device. Each counterbalance valve assigned to a particular port may then be controlled open via cross-over by the pressure present at the other port. In other words, a respective pressurized pilot line that, when pressurized, opens a counterbalance valve is connected to a supply line connected to the other port.

However, in examples, complex system configuration may be required to access or tap into the cross-over pressure lines to operate the counterbalance valves. Such complexity increases manufacturing costs of the valve assembly and hydraulic system that includes the counterbalance valves. It may be desirable to have a valve that, in addition to controlling meter-in fluid flow to an actuator, is configured to internally generate pilot fluid signal so as to operate a counterbalance valve or other load-holding valve.

Disclosed herein is a valve configured to control meter-in flow to an actuator. The disclosed valve can eliminate the pressure reducing valve used in conventional systems. Also, the disclosed valve operates based on a mechanical position feedback of a main movable element rather than based on controlling pressure level of a pilot signal to control position of a spool. This way, enhanced position control can be achieved such that enhanced proportionality can be achieved between a command signal to the valve and flow rate of fluid through the valve. Two such valves can be used to independently control meter-in flow to respective two chambers of an actuator. One of the valves can be actuated while the other remains unactuated. The disclosed valve is configured such that, when actuated, it generates a pilot fluid signal to operate a corresponding counterbalance valve or load-holding valve.

FIG. 1 illustrates a cross-sectional side view of a valve 100 in an unactuated state, in accordance with an example implementation. The valve 100 may be inserted or screwed into a manifold having ports corresponding to ports of the valve 100 described below. The manifold can thus fluidly couple the valve 100 to other components of a hydraulic system.

The valve 100 includes a main stage 102, a pilot stage 104, and a solenoid actuator 106. The valve 100 includes a housing 108 having a longitudinal cylindrical cavity therein. The housing 108 can also be referred to as a valve body or main sleeve of the valve 100. The longitudinal cylindrical cavity of the housing 108 is configured to house portions of the main stage 102, the pilot stage 104, and the solenoid actuator 106.

In examples, the valve 100 can include a nose piece 110 mounted at a distal end of the housing 108. The nose piece 110 can have a through-hole 111 to allow fluid communication therethrough.

The valve 100 includes a first port 112 defined at a nose or distal end of the housing 108. The first port 112 is aligned with the through-hole 111 of the nose piece 110. The first port 112 can also be referred to as an operating or control port and can be configured to be fluidly coupled to a chamber of an actuator (e.g., a hydraulic cylinder or motor) to provide fluid thereto.

The valve 100 also includes a second port 114 that can be referred to as tank port and can be configured to be fluidly coupled to a tank or reservoir of hydraulic fluid. The tank or reservoir can have fluid at a low pressure level, e.g., 0-70 pounds per square inch (psi). The second port 114 can include a set of tank flow cross-holes, such as tank flow cross-hole 115.

The valve 100 can further include a third port 116. The third port 116 can be referred to as an inlet port and is configured to be coupled to a source of fluid (e.g., a pump, an accumulator, etc.). The third port 116 can include a first set of cross-holes that can be referred to as inlet flow cross-holes, such as inlet flow cross-holes 117A, 117B, disposed in a radial array about the housing 108. The third port 116 can further include a second set of cross-holes that can be referred to as pilot cross-holes, such as pilot cross-hole 118. The pilot cross-hole 118 fluidly couples the third port 116 to an annular groove 127 formed in the interior peripheral surface of the housing 108.

The valve 100 can further include a fourth port 119. The fourth port 119 can be referred to as a pilot fluid signal port and is configured to be coupled to a pilot port of a counterbalance valve or other type of load-holding valve, for example. The fourth port 119 can include a set of cross-holes that can be referred to as pilot signal cross-holes, such as pilot signal cross-hole 120. As described below, the valve 100 is configured such that, when actuated, a pilot fluid signal is communicated to the fourth port 119 so as to provide a pilot fluid signal to a pilot port of a load-holding valve (e.g., a counterbalance valve). The pilot signal cross-hole 120 is isolated from (e.g., fluidly decoupled from and does not intersect with) the pilot cross-hole 118.

The valve 100 further includes a piston 121 that is disposed, and slidably accommodated, in the longitudinal cylindrical cavity of the housing 108. The term "piston" is used herein to encompass any type of movable element, such as a spool-type movable element or a poppet-type movable element. The piston 121 is shown in the figures as a spool-type movable element; however, it is contemplated that a poppet-type movable element can be used instead.

Further, the term "slidably accommodated" is used throughout herein to indicate that a first component (e.g., the piston 121) is positioned relative to a second component (e.g., the housing 108) with sufficient clearance therebetween, enabling movement of the first component relative to the second component in the proximal and distal directions. As such, the first component (e.g., piston 121) is not stationary, locked, or fixedly disposed in the valve 100, but is rather allowed to move relative to the second component (e.g., the housing 108).

The piston 121 has a cavity or main chamber 122 therein. The valve 100 further includes a check poppet 123 that is disposed, and slidably accommodated, in the longitudinal cylindrical cavity of the housing 108, longitudinally adjacent to the piston 121. In the unactuated position of the valve 100 shown in FIG. 1, the check poppet 123 is configured to be seated on a seat 124 formed as an annular shoulder or protrusion projecting from an interior peripheral surface of the housing 108. Particularly, the check poppet 123 has a tapered annular surface on an exterior peripheral surface of the check poppet 123. The tapered annular surface is seated on the seat 124 when the valve is unactuated, such that the check poppet 123 fluidly decouples the main chamber 122 from the first port 112.

Thus, the check poppet 123 can block fluid flow from the first port 112 to the second port 114. As such, the valve 100 comprises a built-in check valve functionality that blocks fluid flow from an actuator fluidly coupled to the first port 112. In conventional systems, a separate, additional check valve is added to the system to block fluid flow from the actuator. With the configuration of the valve 100, the check valve is built into the valve 100, and therefore cost of the hydraulic system may be reduced.

The check poppet 123 includes a set of cross-holes, such as check cross-holes 125A, 125B, disposed in a radial array about the check poppet 123. Further, the check poppet 123 includes a pin portion 128 that extends proximally within the main chamber 122 of the piston 121. The pin portion 128 can have a spherical tip 130 that can contact a corresponding spherical cavity formed in the interior surface of the piston 121. This way, the check poppet 123 can be coupled to the piston 121 and they can move axially together. The piston 121 can separate from the check poppet 123 if it moves in the proximal direction while the check poppet 123 is seated on the seat 124. However, if the piston 121 moves in the distal direction after separation, it can re-contact the check poppet 123 and they become coupled to each other.

The valve 100 further includes a return spring 126 disposed between the check poppet 123 and the nose piece 110. Particularly, a distal end of the return spring 126 rests against the nose piece 110, whereas a proximal end of the return spring 126 rests against the check poppet 123. The nose piece 110 is fixed, and therefore the return spring 126 biases the check poppet 123 in the proximal direction to be seated on the seat 124. The return spring 126 can be configured as a stiff spring. As an example for illustration, the return spring 126 can be configured to apply a force of between 6 pound-force (lbf) and 34 lbf on the piston 121 based on the extent of compression of the return spring 126.

As an example for illustration, the return spring 126 can apply a preload on the piston 121 of about 6 lbf, and if the return spring 126 is compressed by about 0.18 inches by movement of the check poppet 123 in the distal direction, the force increases to about 34 lbf.

The piston 121 further includes a first piston cross-hole 129A and a second piston cross-hole 129B that are longitudinally or axially-separated or axially-spaced from each other along a length of the piston 121. When the piston 121 is in a neutral position shown in FIG. 1, the first piston cross-hole 129A is aligned with or overlaps with (e.g., is fluidly coupled to) the pilot signal cross-hole 120.

Further, the piston 121 includes an annular protrusion 131 that has an axial length (e.g., a width) that is less than a width of an annular groove 132 disposed in the interior peripheral surface of the housing 108 and fluidly coupled to the tank flow cross-hole 115. With this configuration, when the piston 121 is in the neutral position shown in FIG. 1, the tank flow cross-hole 115 is fluidly coupled to the main chamber 122.

As such, when the valve 100 is in the unactuated state shown in FIG. 1, the second port 114 is fluidly coupled to the fourth port 119. Thus, fluid at the fourth port 119 (which can be fluidly coupled to a pilot port of a counterbalance valve) is drained to the second port 114 (which can be coupled to a tank) via the pilot signal cross-hole 120, the first piston cross-hole 129A, the main chamber 122, and the tank flow cross-hole 115. This way, the counterbalance valve remains unactuated.

The second piston cross-hole 129B is blocked by the interior surface of the housing 108 when the piston 121 is in the neutral position. Thus, in the neutral position, shown in FIG. 1, the third port 116 is fluidly decoupled from the main chamber 122 and is therefore fluidly decoupled from the first port 112 and the second port 114.

The term "fluidly decoupled" is used herein to mean that no substantial fluid flow (e.g., except for minimal leakage flow of drops per minute) occurs between two ports. Similarly, the term "block" is used throughout herein to indicate substantially preventing fluid flow except for minimal or leakage flow of drops per minute, for example.

The solenoid actuator 106 includes a solenoid tube 134 configured as a cylindrical housing or body disposed within and received at a proximal end of the housing 108, such that the solenoid tube 134 is coaxial with the housing 108. A solenoid coil 136 can be disposed about an exterior surface of the solenoid tube 134. The solenoid coil 136 is retained between a proximal end of the housing 108 and a coil nut 138 having internal threads that can engage a threaded region formed on the exterior peripheral surface of the solenoid tube 134 at its proximal end.

Figure 2:
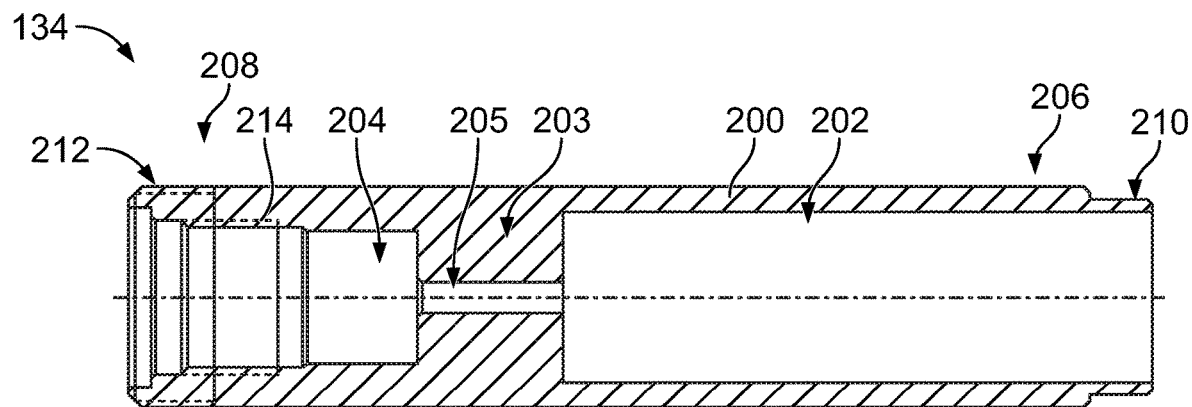
FIG. 2 illustrates a cross-sectional side view of a solenoid tube, in accordance with an example implementation.

FIG. 2 illustrates a cross-sectional side view of the solenoid tube 134, in accordance with an example implementation. As depicted, the solenoid tube 134 has a cylindrical body 200 having therein a first chamber 202 formed within a distal side of the cylindrical body 200 and a second chamber 204 formed within a proximal side of the cylindrical body 200. The solenoid tube 134 includes a pole piece 203 formed as a protrusion within the cylindrical body 200. The pole piece 203 separates the first chamber 202 from the second chamber 204. In other words, the pole piece 203 divides a hollow interior of the cylindrical body 200 into the first chamber 202 and the second chamber 204. The pole piece 203 can be composed of material of high magnetic permeability.

Further, the pole piece 203 defines a channel 205 therethrough. In other words, an interior peripheral surface of the solenoid tube 134 at or through the pole piece 203 forms the channel 205, which fluidly couples the first chamber 202 to the second chamber 204. As such, pressurized fluid provided to the first chamber 202 is communicated through the channel 205 to the second chamber 204.

In examples, the channel 205 can be configured to receive a pin therethrough so as to transfer linear motion of one component in the second chamber 204 to another component in the first chamber 202 and vice versa, as described below. As such, the channel 205 can include chamfered circumferential surfaces at its ends (e.g., an end leading into the first chamber 202 and another end leading into the second chamber 204) to facilitate insertion of such a pin therethrough.

The solenoid tube 134 has a distal end 206, which is configured to be coupled to the housing 108, and a proximal end 208. Particularly, the solenoid tube 134 can have a first threaded region 210 disposed on an exterior peripheral surface of the cylindrical body 200 at the distal end 206 that is configured to threadedly engage with corresponding threads formed in the interior peripheral surface of the housing 108.

Also, the solenoid tube 134 can have a second threaded region 212 disposed on the exterior peripheral surface of the cylindrical body 200 at the proximal end 208 and configured to be threadedly engaged with corresponding threads formed in the interior peripheral surface of the coil nut 138. Further, the solenoid tube 134 can have a third threaded region 214 disposed on an interior peripheral surface of the cylindrical body 200 at the proximal end 208 and configured to threadedly engage with corresponding threads formed in a component of a manual override actuator 168 as described below (see FIG. 1) or other components that can be inserted in the second chamber 204 such as a position sensor. The solenoid tube 134 can also have one or more shoulders formed in the interior peripheral surface of the cylindrical body 200 that can mate with respective shoulders of the manual override actuator 168 to enable alignment of the manual override actuator 168 (or other components) within the solenoid tube 134.

Referring back to FIG. 1, the solenoid tube 134 is configured to house an armature 140 in the first chamber 202. The armature 140 is slidably accommodated within the solenoid tube 134 (i.e., the armature 140 can move axially within the solenoid tube 134). The solenoid actuator 106 further includes a solenoid actuator sleeve 142 received at the proximal end of the housing 108 and disposed partially within a distal end of the solenoid tube 134.

The solenoid actuator sleeve 142 is shown in an unactuated state in FIG. 1 and is configured to move to an actuated state when the valve 100 is actuated (e.g., when the solenoid coil 136 is energized). Particularly, the armature 140 is mechanically coupled to, or linked with, the solenoid actuator sleeve 142. As such, if the armature 140 moves axially (e.g., in the proximal direction) when the solenoid coil 136 is energized, the solenoid actuator sleeve 142 moves along with the armature 140 in the same direction. The armature 140 can be coupled to the solenoid actuator sleeve 142 in several ways.

Figure 3:
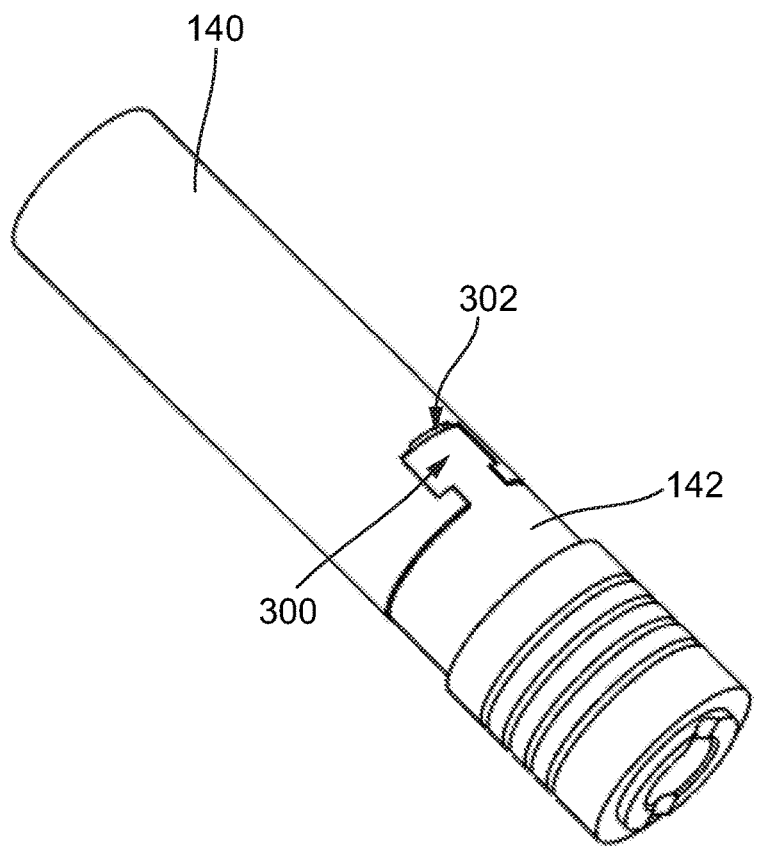
FIG. 3 illustrates a three-dimensional perspective view showing an armature coupled to a solenoid actuator sleeve, in accordance with another example implementation.

FIG. 3 illustrates a three-dimensional partial perspective view showing the armature 140 coupled to the solenoid actuator sleeve 142, in accordance with an example implementation. As shown, the solenoid actuator sleeve 142 can have a male T-shaped member 300, and the armature 140 can have a corresponding female T-slot 302 formed as an annular internal groove configured to receive the male T-shaped member 300 of the solenoid actuator sleeve 142.

With this configuration, the armature 140 and the solenoid actuator sleeve 142 are coupled to each other such that if the armature 140 moves, the solenoid actuator sleeve 142 moves therewith.

Referring back to FIG. 1, the armature 140 includes a longitudinal channel 144 formed therein. The armature 140 further includes a protrusion 146 within the longitudinal channel 144. As mentioned above, the solenoid tube 134 includes the pole piece 203 formed as a protrusion within the cylindrical body 200. The pole piece 203 is separated from the armature 140 by an airgap 148 that varies in length based on axial position of the armature 140.

The solenoid actuator sleeve 142 has a hole 160 at its distal end. Further, the piston 121 has a proximal piston portion 158 that extends proximally through the hole 160 of the solenoid actuator sleeve 142.

The solenoid actuator sleeve 142 forms therein a chamber 150 configured to house a feedback spring 152. Further, the valve 100 includes a spring cap 156 disposed about an exterior peripheral surface of the proximal piston portion 158 of the piston 121, where the proximal piston portion 158 extends within the chamber 150 through the hole 160 formed in the distal end of the solenoid actuator sleeve 142. With this configuration, the feedback spring 152 is disposed within the solenoid actuator sleeve 142 such that a distal end of the feedback spring 152 interfaces with an interior surface of the solenoid actuator sleeve 142, and a proximal end of the feedback spring 152 rests against the spring cap 156.

The valve 100 further includes a wire ring 164 disposed in an annular groove formed in an exterior peripheral surface of the proximal piston portion 158 of the piston 121. The wire ring 164 protrudes radially outward to engage the spring cap 156. With this configuration, a force that is applied to the piston 121 in the distal direction is transferred to the spring cap 156 via the wire ring 164. Similarly, a force that is applied to the spring cap 156 in the proximal direction is transferred to the piston 121 via the wire ring 164. In other example implementations, rather than using the wire ring 164, a protrusion can be formed on the exterior surface of the proximal piston portion 158 or a washer can be disposed thereon.

The feedback spring 152 applies a biasing force on the solenoid actuator sleeve 142 in the distal direction and applies a biasing force on the piston 121 in the proximal direction. These biasing forces affect the force balance between forces acting on the solenoid actuator sleeve 142 and forces acting on the piston 121, and thereby affect equilibrium axial position of the piston 121.

Specifically, based on a spring rate of the feedback spring 152 and its length, the feedback spring 152 exerts a particular preload or biasing force (e.g., 2 lbf) on the solenoid actuator sleeve 142 in the distal direction. The preload or biasing force causes the solenoid actuator sleeve 142 to be biased toward the neutral position or unactuated state shown in FIG. 1 where the annular groove 127 and the pilot cross-hole 118 are blocked by the solenoid actuator sleeve 142. When the pilot cross-hole 118 is blocked as shown in FIG. 1, the fluid at the third port 116 does not apply a fluid force on the piston 121 in the distal direction, and the piston 121 remains in the neutral position shown in FIG. 1 where it allows fluid at the fourth port 119 to be drained to the second port 114, while blocking fluid flow from the third port 116 to the second port 114 or the first port 112.

To actuate the valve 100, an electric command signal can be sent from a controller of a hydraulic system to the solenoid coil 136. When an electrical current is provided through the windings of the solenoid coil 136 to actuate the valve 100, a magnetic field is generated. The pole piece 203 directs the magnetic field through the airgap 148 toward the armature 140, which is movable and is attracted toward the pole piece 203. In other words, when an electrical current is applied to the solenoid coil 136, the generated magnetic field forms a north and south pole in the pole piece 203 and the armature 140, and therefore the pole piece 203 and the armature 140 are attracted to each other. Because the pole piece 203 is fixed and the armature 140 is movable, the armature 140 can traverse the airgap 148 toward the pole piece 203, and the airgap 148 is reduced. As such, a solenoid force is applied on the armature 140, where the solenoid force is a pulling force that tends to pull the armature 140 in the proximal direction. The solenoid force is proportional to a magnitude of the electrical command signal (e.g., magnitude of electrical current or voltage applied to the solenoid coil 136).

Figure 4:
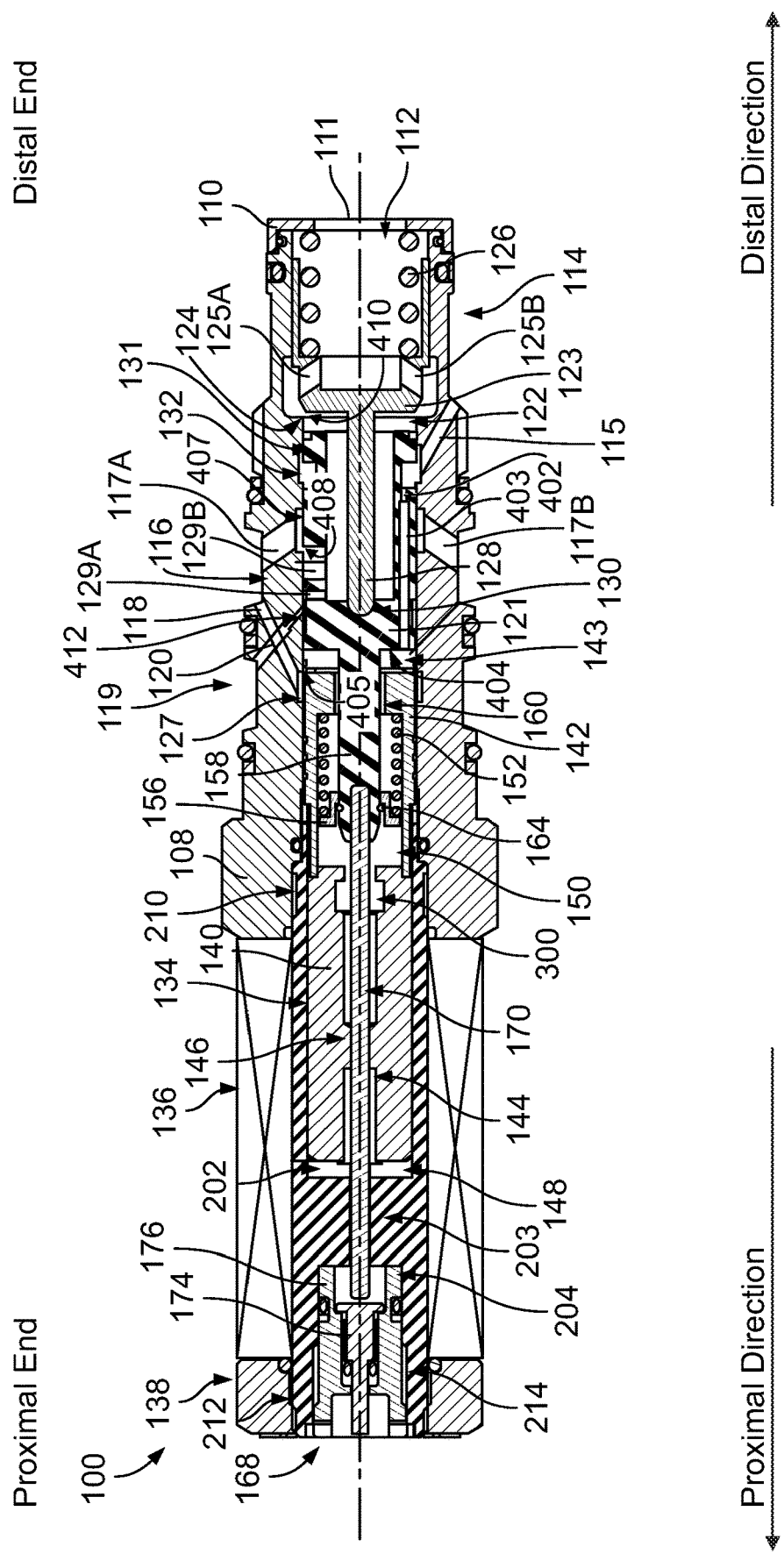
FIG. 4 illustrates a cross-sectional side view of a valve in an actuated state, in accordance with an example implementation.

FIG. 4 illustrates a cross-sectional side view of the valve 100 in an actuated state, in accordance with an example implementation. The solenoid force applied to the armature 140 is also applied to the solenoid actuator sleeve 142, which is coupled to the armature 140 as described above with respect to FIG. 3. The solenoid actuator sleeve 142 in turn applies a compressive force in the proximal direction on the feedback spring 152, which is thus compressed between the solenoid actuator sleeve 142 and the spring cap 156.

As the command signal to the solenoid coil 136 increases, the solenoid force can overcome the biasing force of the feedback spring 152 on the solenoid actuator sleeve 142, and the solenoid actuator sleeve 142 moves in the proximal direction to the actuated state position shown in FIG. 4, as an example. As the solenoid actuator sleeve 142 starts to move past a distal edge of the annular groove 127, as depicted in FIG. 4, the annular groove 127 and the pilot cross-hole 118 become partially unblocked (e.g., at least a portion of the annular groove 127 is exposed). The partial opening of the annular groove 127 (the portion of the annular groove 127 that is exposed when the solenoid actuator sleeve 142 moves past its distal edge) can be referred to as a flow restriction 405.

Further, a pilot chamber 143 is formed as the solenoid actuator sleeve 142 moves proximally, where the pilot chamber 143 separates the solenoid actuator sleeve 142 from the piston 121. This way, the pilot chamber 143 becomes fluidly coupled to the third port 116 via the pilot cross-hole 118 and receives fluid from the third port 116.

As shown in FIG. 4, the piston 121 has an orifice 402 and a longitudinal channel 403 formed therein. With this configuration, the orifice 402 is fluidly coupled to the pilot chamber 143 via the longitudinal channel 403. As an example for illustration, the orifice 402 can have a diameter of about 0.021 inches.

Thus, as the solenoid actuator sleeve 142 moves past the distal edge of the annular groove 127, a pilot flow path from the third port 116 to the second port 114 is formed or opened. The pilot flow path includes (i) the pilot cross-hole 118, (ii) the annular groove 127, (iii) the flow restriction 405, (iv) the pilot chamber 143, (v) the longitudinal channel 403, (vi) the orifice 402, (vii) the annular groove 132, and (viii) the tank flow cross-hole 115. Once the pilot flow path is formed or opened, pilot fluid can flow from the third port 116 through the pilot cross-hole 118 to the annular groove 127, through the flow restriction 405 to the pilot chamber 143, then through the longitudinal channel 403 and the orifice 402 an annular space between the piston 121 and the interior surface of the housing 108, to the annular groove 132 and the tank flow cross-hole 115, then to the second port 114, which can be fluidly coupled to a tank or reservoir. Such pilot fluid flow from the third port 116 to the second port 114 can be referred to as the pilot flow. As an example for illustration, the pilot flow can amount to about 0.15 gallons per minute (GPM).

The pilot flow through the flow restriction 405 causes a pressure drop in the pressure level of the fluid between the fluid at the third port 116 and the pilot chamber 143. For example, if pressure level at the third port 116 is 5000 psi, the pressure level within the pilot chamber 143 can be about 200 psi when the solenoid actuator sleeve 142 is in the position shown in FIG. 4. The orifice 402 causes another pressure drop between the pressure level in the pilot chamber 143 and the pressure level in the tank that is fluidly coupled to the second port 114.

The axial position of the solenoid actuator sleeve 142 determines an extent of the portion of annular groove 127 that is exposed, i.e., determines a size of the flow restriction 405. Larger axial movement of the solenoid actuator sleeve 142 in the proximal direction can increase the size of the flow restriction 405, and the pressure level in the pilot chamber 143 can responsively increase.

The pressurized fluid in the pilot chamber 143 applies a fluid force on an annular area 404 of the piston 121 in the distal direction. Further, the pressurized fluid in the pilot chamber 143 is communicated through the hole 160 of the solenoid actuator sleeve 142 and through unsealed spaces to the proximal end of the chamber 150 within the solenoid actuator sleeve 142. The pressurized fluid at the proximal end of the chamber 150 also applies a fluid force on the proximal end of the piston 121 in the distal direction.

The fluid forces acting on the piston 121 in the distal direction are transferred or are also applied to the check poppet 123 due to interaction with the pin portion 128 of the check poppet 123 with the piston 121. When the fluid forces acting on the piston 121 and the check poppet 123 overcome the biasing force of the return spring 126, the piston 121 and the check poppet 123 move in the distal direction to an actuated position or actuated state shown in FIG. 4. As shown in the actuated position of FIG. 4, the check poppet 123 has moved off the seat 124.

As the piston 121 moves in the distal direction to the actuated position shown in FIG. 4, the annular protrusion 131 of the piston 121 blocks fluid flow from the main chamber 122 to the annular groove 132 and the tank flow cross-hole 115. Thus, fluid flow from the fourth port 119 through the first piston cross-hole 129A to the second port 114 is blocked. In other words, the second port 114 becomes fluidly decoupled from the fourth port 119.

Further, in the actuated position of the piston 121, the second piston cross-hole 129B becomes overlapped, at least partially, with an annular groove 407 formed in the interior peripheral surface of the housing 108 and fluidly coupled to the inlet flow cross-holes 117A, 117B. The second piston cross-hole 129B is in turn fluidly coupled to the main chamber 122. Thus, fluid received from a source of fluid (e.g., a pump) providing fluid to the third port 116 can be communicated to the main chamber 122 via the inlet flow cross-holes 117A, 117B, the annular groove 407, and the second piston cross-hole 129B.

The overlap between the second piston cross-hole 129B and the annular groove 407 operates as a flow restriction 408 between the annular groove 407 and the second piston cross-hole 129B. The size of the flow restriction 408 varies based on the axial position of the piston 121.

Further, as the piston 121 moves in the distal direction to the actuated position, it applies a force via the wire ring 164 to the spring cap 156, thereby causing the feedback spring 152 to be compressed between the spring cap 156 and the solenoid actuator sleeve 142. As the feedback spring 152 is compressed, the force that it applies to the piston 121 in the proximal direction (via the wire ring 164) increases because the force that a spring applies is equal to an amount of axial compression multiplied by its spring rate.

The axial position of the piston 121 in response to the command signal to the solenoid coil 136 is determined by or is based on a relationship (e.g., force equilibrium or force balance) between the various forces applied to the piston 121. Particularly, the feedback spring 152 can be compressed until the force that it applies to the piston 121 in the proximal direction (in addition to a respective biasing force of the return spring 126 acting on the check poppet 123 and the piston 121 in the proximal direction) balances the fluid force applied to the piston 121 in the distal direction. The term "balances" is used herein to indicate that the total force acting on the piston 121 in the proximal direction is equal in magnitude and is opposite in direction relative to the total force acting on the piston 121 in the distal direction.

As the command signal to the solenoid coil 136 increases, the solenoid force increases and the armature 140 as well as the solenoid actuator sleeve 142 move further in the proximal direction, thereby increasing sizes of the openings of the flow restriction 405 and the flow restriction 408. As a result, the pressure drop through the flow restriction 405 decreases and the pressure level in the pilot chamber 143 increases. As the pressure level of fluid in the pilot chamber 143 increases, the fluid force that it applies to the piston 121 in the distal direction increases and the piston 121 moves further in the distal direction. As the piston 121 moves further in the distal direction, the feedback spring 152 is compressed further, and the force it applies on the piston 121 in the proximal direction increases until it balances the fluid force acting on the piston 121 in the distal direction. For example, if the feedback spring 152 has a spring rate of 80 pound-force per inch, then the force that the feedback spring 152 applies can proportionally vary between 2 pounds and 10 pounds during a 0.1 inch compression. Once such force balance or relationship between the forces acting on the piston 121 is achieved, the piston 121 stops at an axial position that is substantially proportional to the command signal to the solenoid coil 136.

Further, as depicted in FIG. 4, as the check poppet 123 is unseated off the seat 124, an annular main flow area 410 is formed between the exterior peripheral surface of the check poppet 123 and the seat 124 of the housing 108. Thus, in the actuated position of the piston 121 and the check poppet 123, a main flow path is formed through which fluid at the third port 116 is allowed to flow to the first port 112. Particularly, fluid at the third port 116 is allowed to flow through the inlet flow cross-holes 117A, 117B, then through the flow restriction 408 and the second piston cross-hole 129B to the main chamber 122, then through the annular main flow area 410, then through the check cross-holes 125A, 125B to the first port 112 and then to the actuator that can be fluidly coupled to the first port 112.

The annular main flow area 410 can increase in size as the piston 121 moves further in the distal direction and the feedback spring 152 is compressed further. The flow through the annular main flow area 410 can be referred to as the main flow. As an example for illustration, the main flow rate can amount to up to 25 GPM based on the axial position of the piston 121. The 25 GPM main flow rate is an example for illustration only. The valve 100 is scalable in size and different amounts of main flow rates can be achieved.

A command signal to the solenoid coil 136 proportionally corresponds to an axial position of the piston 121, and thus proportionally corresponds to the sizes of the flow restriction 408 and the annular main flow area 410. As such, flow rate through the valve can be proportionally modulated by the command signal to the solenoid coil 136.

As the main flow occurs from the third port 116 to the first port 112 through the flow restriction 408, a pressure drop in the pressure level of the fluid between the fluid at the third port 116 and the main chamber 122 occurs. The pressure level of fluid in the main chamber 122 can be indicative of a load that the actuator coupled to the first port 112 is subjected to.

The actuator can have two sides or chambers. Fluid provided from the third port 116 to the first port 112 of the valve 100 is provided to a first chamber of the actuator, whereas fluid out of a second chamber of the actuator can be controlled by a load-holding valve, e.g., a counterbalance valve. The counterbalance valve is configured to receive a pilot fluid signal that cooperates with pressure in the second chamber to open the counterbalance valve. Beneficially, the valve 100 is configured to generate such pilot fluid signal from the main chamber 122 to the fourth port 119 to open a counterbalance valve.

Particularly, as the piston 121 moves in the distal direction, in addition to forming a main flow path, a pilot fluid signal path is also formed and a pilot fluid signal is generated at the fourth port 119. Specifically, the pressurized fluid provided to the main chamber 122, which is then provided to the actuator via the annular main flow area 410 and the first port 112, is also communicated to the fourth port 119 via a pilot fluid signal path. The pilot fluid signal path includes (i) the first piston cross-hole 129A, which is fluidly coupled to the main chamber 122, (ii) an annular groove 412 formed in an exterior peripheral surface of the piston 121, and (iii) the pilot signal cross-hole 120, which is fluidly coupled to the annular groove 412.

This way, a pilot fluid signal is generated by fluid flowing from the main chamber 122, through the first piston cross-hole 129A, the annular groove 412, and the pilot signal cross-hole 120 to the fourth port 119. The fourth port 119 can be coupled to a pilot port of a counterbalance valve so as to provide the pilot fluid signal thereto and allow the counterbalance valve to open and control fluid flow of fluid forced out of the second chamber of the actuator.

The configuration of the valve 100 can offer several enhancements compared to conventional valve configurations. As mentioned above, the return spring 126 can be configured as a stiff spring (e.g., a spring that can cause a high force such as a force between 20 lbf and 80 lbf depending on a size of the valve 100). This way, when the command signal to the solenoid coil 136 is reduced or removed, the return spring 126 can push check poppet 123 and the piston 121 toward their unactuated position against the fluid force on the piston 121. The return spring 126 can also reduce hysteresis of the valve 100 by facilitating positioning the piston 121 at an axial position that is predictable based on the command signal to the solenoid coil 136. In other words, the return spring 126 reduces a lag between movement of the piston 121 and the change in the command signal to the solenoid coil 136. However, it should be understood that the valve 100 can be operable without the return spring 126.

Further, the valve 100 comprises a mechanical feedback configuration provided by the feedback spring 152 such that a force equilibrium between the biasing force of the feedback spring 152 acting on the piston 121 in the proximal direction and the fluid force acting on the piston 121 in the distal direction determines the equilibrium position of the piston 121. The equilibrium position of the piston 121 in turn determines the amount of flow rate through the valve 100. As such, an intermediate step of having to control a pilot pressure level by a pressure reducing valve to then control stroke of a spool of a directional spool valve, as used in conventional systems, can be eliminated.

Further, the piston 121 is not directly mechanically-coupled to the armature 140, and thus the stroke of the piston 121 can be different from the stroke of the armature 140. The stroke of the piston 121 is based on the spring rate of the feedback spring 152 and the pressure level in the pilot chamber 143. With this configuration, the piston 121 can have a longer stroke compared to the stroke of the armature 140. This contrasts with conventional valves having an armature directly acting on a movable element (e.g., a piston) such that the position of the armature is coupled to the position of the movable element, and thus the position of the movable element is limited by the magnitude of the solenoid force generated by the armature.

Further, the valve 100 is configured to internally generate a pilot fluid signal that can be provided to open a load-holding valve, e.g., open a counterbalance valve. This configuration can save cost and enhance reliability because no external hydraulic connection is needed to tap into a hydraulic line connecting the first port 112 to the actuator. Rather, the pilot fluid signal is generated internally within the valve 100 and provided to the counterbalance valve.

Notably, when the valve 100 is in the actuated state, the pilot flow from the pilot chamber 143 through the longitudinal channel 403 and the orifice 402 to the second port 114 is determined based on pressure difference between pressure level of fluid in the pilot chamber 143 (e.g., 200 psi) and the fluid at the second port 114 (e.g., 0-70 psi at a tank). This contrasts with conventional valves where pilot flow is provided from an inlet port with fluid having maximum system pressure (e.g., 5000 psi) to the tank. Thus, the pilot flow generated in the valve 100 can be much smaller than the pilot flow generated in conventional valves. Because pilot flow can be considered as a loss as it is not provided to the actuator, having a reduced pilot flow may cause a reduction in power loss and may enhance efficiency of the hydraulic system.

Also, the preload of the feedback spring 152 allows the valve 100 to have a dead band or a dead zone such that a command signal that is larger than zero (e.g., command signal of about 20% of maximum command) places the valve 100 in a state that where flow can be modulated from the third port 116 to the second port 114. With this configuration, if the controller of the valve 100 is not well-calibrated and produces a few milliamps of current without a command signal being sent thereto, the valve 100 is not actuated, thus rendering the valve 100 safer to operate.

In some applications, it may be desirable to have a manual override actuator coupled to the valve 100 so as to allow the valve 100 to be manually actuated to place a machine in a safe condition, for example, if the solenoid actuator 106 malfunctions. Actuating the valve 100 using the manual override actuator can place the valve 100 in the actuated state shown in FIG. 4, for example, thereby allowing for fluid at the third port 116 (e.g., from a pump) to be communicated to the first port 112, and then to the actuator so as to place the actuator in a safe condition.

Referring to FIG. 1, the valve 100 includes a manual override actuator 168 configured to allow for actuating or opening the valve 100 if the solenoid actuator 106 malfunctions. The manual override actuator 168 includes a pin 170 disposed through the channel 205. The pin 170 is disposed through a blind-hole formed at a proximal end of the proximal piston portion 158 of the piston 121. With this configuration, movement of the pin 170 in the distal direction can cause the piston 121 to move in the distal direction, thereby opening the main flow path and fluidly coupling the third port 116 to the first port 112.

The manual override actuator 168 includes a manual override piston 174. The manual override piston 174 can be guided within a nut 176. The nut 176 in turn is threadedly coupled to the solenoid tube 134 at the threaded region 214.

As shown in FIG. 1, a gap separates the pin 170 and the manual override piston 174. With this configuration, the piston 121 is allowed to float or be axially movable between the check poppet 123 and the manual override piston 174. Thus, the piston 121 can be separated from the check poppet 123 under some operating conditions; however, as the piston 121 moves in the distal direction, it mates with the spherical tip 130 of the check poppet, and thereafter the piston 121 and the check poppet 123 can move together in the distal direction.

If the manual override piston 174 is pushed in the distal direction, e.g., by an operator, the manual override piston 174 moves in the distal direction (e.g., to the right in FIG. 1) and can then contact the pin 170. Further axial motion of the manual override piston 174 in the distal direction causes the pin 170, the piston 121, and the check poppet 123 to move in the distal direction, thereby opening the main flow path from the third port 116 to the first port 112. If the manual override piston 174 is released, the feedback spring 152 can push back the piston 121, the pin 170, and the manual override piston 174 in the proximal direction. The return spring 126 can then return the check poppet 123 to its seated position in FIG. 1 to close the valve 100.

In other example implementations, rather than having the manual override actuator 168 in the second chamber 204, a position sensor can be included therein. For example, the pin 170 can be coupled to a position sensor such that movement of the pin 170 is converted to a position signal that can be provided to a controller of a hydraulic system that includes the valve 100. The position signal can be indicative of the axial position of the piston 121. Thus, the controller can determine the axial position of the piston 121 and adjust the command signal to the solenoid coil 136 accordingly to adjust the main flow rate through the flow restriction 408 and the annular main flow area 410.

As a particular example, the valve 100 can include a Linear Variable Differential Transformer (LVDT) or other type of electromechanical transducer that can convert the rectilinear motion of the pin 170 and the piston 121 into a corresponding electrical signal. In this example, the pin 170 can be made of a magnetically permeable material, and the LVDT can include primary and secondary coils disposed in the second chamber 204. The primary coil can be disposed at the center of the LVDT, whereas two secondary coils are wound symmetrically on each side of the primary coil or on top of the primary coil. The coils can be wound on a one-piece hollow form to allow the pin 170 to move axially within the space inside the coils. In operation, the LVDT's primary coil can be energized by alternating current of appropriate amplitude and frequency, known as the primary excitation. The LVDT's electrical output signal is the differential AC voltage between the two secondary coils, which varies with the axial position of the pin 170 within the coils. The AC output voltage can be converted by suitable electronic circuitry to high level DC voltage or current that is then provided to the controller.

An LVDT is used herein as an example for illustration. Other types of position sensors can be used including a capacitive transduce, a capacitive displacement sensor, an Eddy-current sensor, an ultrasonic sensor, a grating sensor, a Hall-Effect sensor, an inductive non-contact position sensor, or an anisotropic magneto-resistive sensor as examples.

Figure 5:
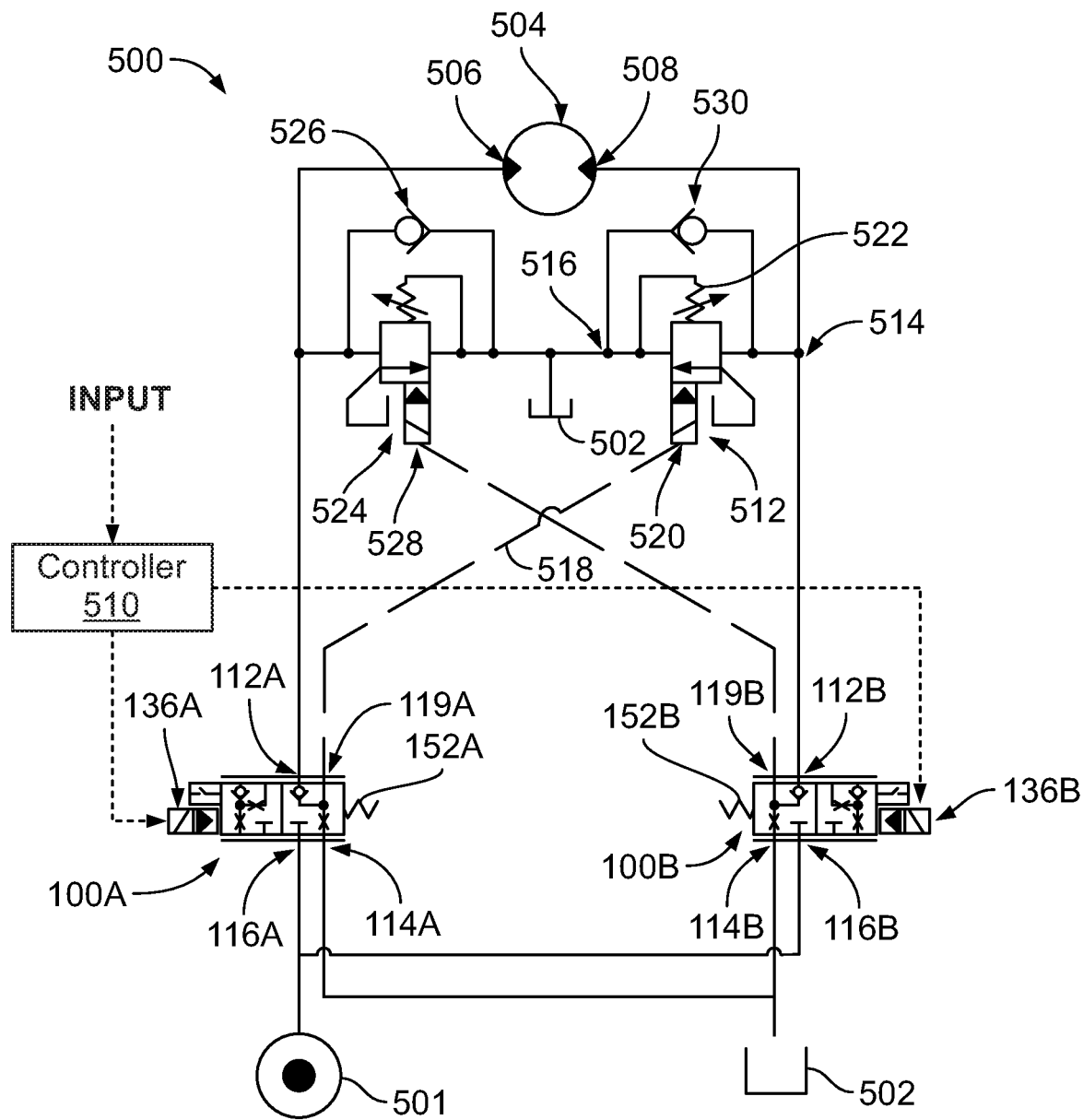
FIG. 5 illustrates a hydraulic system, in accordance with an example implementation.

FIG. 5 illustrates a hydraulic system 500, in accordance with an example implementation. The hydraulic system 500 includes two valves 100A, 100B that each symbolically represents the valve 100. The valves 100A, 100B have the same components of the valve 100. Therefore, the components or elements of the valves 100A, 100B are designated with the same reference numbers used for the valve 100 with an "A" or "B" suffix to correspond to the valves 100A, 100B respectively.

The hydraulic system 500 includes a source 501 of fluid (e.g., a pump or accumulator) that can provide fluid to the third ports 116A, 116B of the valves 100A, 100B, respectively. The hydraulic system 500 also includes a reservoir or tank 502 of fluid that can store fluid at a low pressure (e.g., 0-70 psi). The second ports 114A, 114B of the valves 100A, 100B are respectively fluidly coupled to the tank 502. The tank 502 is drawn at two locations in FIG. 5 to reduce visual clutter of schematic hydraulic connections to the tank 502. It should be understood that a hydraulic system can have one tank or reservoir. The source 501 can be configured to receive fluid from the tank 502, pressurize the fluid, and then provide pressurized fluid to the third ports 116A, 116B of the valves 100A, 100B.

The valves 100A, 100B are configured as meter-in valves configured to control fluid flow to and from an actuator, such as motor 504. The motor 504 can be any type of hydraulic motor (e.g., gear or vane motor, gerotor motor, axial plunger motor, or radial piston motor). The motor 504 can, for example, control swing mechanism of an excavator. A motor is used herein as an example to illustration operation of the hydraulic system 500. Other types of hydraulic actuators can be used, such as a hydraulic actuator having a cylinder and a piston that is movable linearly within the cylinder.

The motor 504 includes a first actuator port 506 and a second actuator port 508. If fluid is provided to the first actuator port 506 and exits the motor 504 at the second actuator port 508, the motor 504 rotates in a first direction (e.g., counter-clockwise). On the other hand, if fluid is provided to the second actuator port 508 and exits the motor 504 at the first actuator port 506, the motor 504 rotates in a second direction (e.g., clockwise) opposite the first direction. The first port 112A of the valve 100A is fluidly coupled to the first actuator port 506 of the motor 504, whereas the first port 112B of the valve 100B can be fluidly coupled to the second actuator port 508 of the motor 504.

The hydraulic system 500 can include a controller 510. The controller 510 can include one or more processors or microprocessors and may include data storage (e.g., memory, transitory computer-readable medium, non-transitory computer-readable medium, etc.). The data storage may have stored thereon instructions that, when executed by the one or more processors of the controller 510, cause the controller 510 to perform operations described herein. Signal lines to and from the controller 510 are depicted as dashed lines in FIG. 5. The controller 510 can receive input or input information comprising sensor information via signals from various sensors or input devices in the hydraulic system 500, and in response provide electrical signals to various components of the hydraulic system 500 such as the solenoid coils 136A, 136B and the source 501.

For example, the controller 510 can receive a command or input information requesting rotating the motor 504 in a first direction. The controller 510 can then send a signal to the solenoid coil 136A of the valve 100A. As a result, the armature 140 and the solenoid actuator sleeve 142 of the valve 100A can move in the proximal direction against the biasing forces of the feedback spring 152A and a pilot flow path can be opened from the third port 116A to the second port 114A similar to the description above with respect to FIG. 4. Particularly, pilot fluid can flow from the third port 116A through the pilot cross-hole 118 to the pilot chamber 143, then through the longitudinal channel 403 and the orifice 402, then through the tank flow cross-hole 115 to the second port 114A.

As described above with respect to FIG. 4, the pressurized fluid in the pilot chamber 143 applies a fluid force on the piston 121 in the distal direction, thereby causing the piston 121 and the check poppet 123 to move axially in the distal direction against the biasing forces of the feedback spring 152A. As a result, the piston 121 blocks fluid flow path from the fourth port 119A to the second port 114A, and another fluid flow path opens from the third port 116A to the first port 112A, e.g., through the inlet flow cross-holes 117A, 117B, the annular groove 407, the flow restriction 408, the second piston cross-hole 129B, the main chamber 122, the annular main flow area 410, and the check cross-holes 125A, 125B to the first port 112A. The fluid then flows from the first port 112A of the valve 100A to the first actuator port 506 of the motor 504, thereby rotating the motor 504 is the first direction.

Thus, by providing a command signal having a particular command signal to the solenoid coil 136A of the valve 100A, a proportional amount of fluid is provided from the source 501 to the first actuator port 506 of the motor 504. Thus, the valve 100A meters-in a particular desired amount of fluid flow to move the motor 504 at a particular speed based on the magnitude of the command signal from the controller 510.

At the same time, a pilot fluid signal is generated through the pilot fluid signal path, as described above, and provided to the fourth port 119A of the valve 100. Particularly, the pressurized fluid provided to the main chamber 122 is also communicated to the fourth port 119A via a pilot fluid signal path. The pilot fluid signal path includes (i) the second piston cross-hole 129B, the main chamber 122, the first piston cross-hole 129A, the annular groove 412, and the pilot signal cross-hole 120 to the fourth port 119A of the valve 100A.

As the motor 504 rotates in the first direction, fluid is forced out of the second actuator port 508 of the motor 504. A first counterbalance valve 512 can be installed in the hydraulic line connecting the second actuator port 508 to the tank 502 to control or restrict fluid forced out of the second actuator port 508. Counterbalance valves are used in the hydraulic system 500 as example load-holding valves; however, other types of pilot-operated load-holding valves can be used.

When the first counterbalance valve 512 is actuated, fluid forced out of the second actuator port 508 can flow to a load port 514 of the first counterbalance valve 512, then through a restriction formed within the first counterbalance valve 512, then to a port 516 that is fluidly coupled to the tank 502. The valve 100B, and particularly, the check poppet 123 of the valve 100B operates as a check valve that blocks fluid at the first port 112B of the valve 100B and blocks fluid at the load port 514 of the first counterbalance valve 512 from flowing through the valve 100B.

To open the first counterbalance valve 512, a pilot line 518 fluidly couples the fourth port 119A of the valve 100A to a pilot port 520 of the first counterbalance valve 512. A pilot pressure fluid signal received at the pilot port 520 through the pilot line 518 from the fourth port 119A acts together with the pressure induced in the second actuator port 508 of the motor 504 against a force generated by a setting spring 522 of the first counterbalance valve 512. The combined action of the pilot pressure fluid signal and the induced pressure at the second actuator port 508 of the motor 504 can cause the first counterbalance valve 512 to open and form a restriction therein to allow flow therethrough to the tank 502.

If the motor 504 tends to increase its speed, pressure level at the first actuator port 506 and the pilot line 518 may decrease. As a result, the first counterbalance valve 512 restricts fluid flow therethrough to preclude a load controlled by the motor 504 from rotating at large speeds (i.e., precludes the load from overrunning). With this configuration, meter-in fluid flow is controlled via the valve 100A independently from meter-out flow through the first counterbalance valve 512.

Further, the hydraulic system includes a second counterbalance valve 524. The second counterbalance valve 524 has a free-flow check valve 526 that can allow fluid to flow from the tank 502 to the first actuator port 506 to prevent cavitation at the first actuator port 506. In this example, the tank 502 can be configured to have fluid with a slightly elevated pressure level (e.g., 70 psi) from atmospheric pressure to allow fluid to flow from the tank 502 to the first actuator port 506.

The configuration of FIG. 5 offers several enhancements over conventional hydraulic systems having a spool valve controlled by a pressure reducing valve. The construction of the spool valve is such that a given position of the spool determines the meter-in and meter-out restriction sizes at the same time. Thus, metering-in and metering-out are coupled and the valve has one degree of freedom, and can control can control either the speed of the motor 504 or the pressure at just one of the ports 506, 508 but not both. Thus, it can provide for speed control but it cannot achieve efficient operation at the same time.

Further, in the case of an overrunning load, which happens when moving a load with gravity assistance or when decelerating a large inertial load, for example, spool valves are designed such that the outlet restriction is used to control the flow so as to prevent the load from moving at uncontrollable speeds. However, in other operating conditions, this restriction is not needed yet it is inherent in the design of the spool valve and causes energy loss. With the configuration of FIG. 5, however, the meter-out fluid flow is controlled by the first counterbalance valve 512, independent from the valve 100A.

Further, some spool valves are actuated via a pilot fluid signal generated by a pressure reducing valve that is added to the system and is configured to receive fluid from the pump and reduce its pressure level before providing the pilot signal fluid having the reduced pressure level to the spool valve to move its spool. Having such a pressure reducing valve can increase the cost of the hydraulic system. Further, such a hydraulic system involves first reducing pressure level then controlling a stroke of the spool of the spool valve. Such configuration can lead to poor resolution and poor proportionality between a command signal to the pressure reducing valve and a position of the spool of the spool valve. With the configuration of the valves 100, however, as described above, the mechanical force feedback that determines the axial position of the piston 121 within the valve 100 may offer enhanced flow control through the valve 100 compared to a configuration where a pressure reducing valve controls a pilot pressure level that actuates a spool valve.

Further, the pilot pressure fluid signal that actuates the first counterbalance valve 512 is generated internally in the valve 100A at the fourth port 119A. Thus, no hydraulic lines are used to tap into line connecting the first port 112A to the first actuator port 506 and the complexity of the hydraulic system 500 may thus be reduced.

The controller 510 can also receive a command or input information requesting rotating the motor 504 in the opposite direction. The controller 510 can then send a signal to the solenoid coil 136B of the valve 100B to provide fluid flow from the third port 116B of the valve 100B to the first port 112B thereof and then to the second actuator port 508 of the motor 504.

At the same time, a pilot pressure fluid signal is generated at the fourth port 119B, which is fluidly coupled to a pilot port 528 of the second counterbalance valve 524 to open the second counterbalance valve 524 and allow fluid to flow from the first actuator port 506 to the tank 502. The check poppet 123 of the valve 100A blocks fluid at the first port 112A to force fluid through the second counterbalance valve 524 to the tank 502. The first counterbalance valve 512 has a free-flow check valve 530 that can allow fluid to flow from the tank 502 to the second actuator port 508 of the motor 504 if loading conditions allow pressure level at the second actuator port 508 to be reduced below a threshold pressure value (e.g., 50 psi) to prevent cavitation.

FIG. 6 is a flowchart of a method 600 for operating a valve, in accordance with an example implementation. The method 600 shown in FIG. 6 presents an example of a method that can be used with the valve 100 shown throughout the Figures, for example. The method 600 may include one or more operations, functions, or actions as illustrated by one or more of blocks 602-608. Although the blocks are illustrated in a sequential order, these blocks may also be performed in parallel, and/or in a different order than those described herein. Also, the various blocks may be combined into fewer blocks, divided into additional blocks, and/or removed based upon the desired implementation. It should be understood that for this and other processes and methods disclosed herein, flowcharts show functionality and operation of one possible implementation of present examples. Alternative implementations are included within the scope of the examples of the present disclosure in which functions may be executed out of order from that shown or discussed, including substantially concurrent or in reverse order, depending on the functionality involved, as would be understood by those reasonably skilled in the art.

At block 602, the method 600 includes operating the valve 100 in a first state, where the valve 100 comprises the first port 112 configured to be fluidly coupled to an actuator, the second port 114 configured to be fluidly coupled to the tank 502, the third port 116 configured to be fluidly coupled to the source 501 of fluid, and the fourth port 119 configured to be fluidly coupled to a pilot port of a load-holding valve (e.g., the pilot port 520 or 528 of the counterbalance valve 512 or 524), where in the first state of the valve 100, the fourth port 119 is fluidly coupled to the second port 114 to drain the pilot port of the load-holding valve to the tank.

At block 604, the method 600 includes receiving an electric signal (e.g., from the controller 510) energizing the solenoid coil 136 of the solenoid actuator 106 of the valve 100 to operate the valve 100 in a second state (e.g., the state shown in FIG. 4).

At block 606, the method 600 includes, responsively, causing the armature 140 and the solenoid actuator sleeve 142 coupled thereto to move, thereby (i) compressing the feedback spring 152 to increase biasing force applied by the feedback spring 152 on the piston 121 of the valve 100 in a proximal direction, and (ii) opening a pilot flow path to allow pilot fluid to flow from the third port 116 to the second port 114, wherein the pilot fluid applies a fluid force on the piston 121 in the distal direction, and wherein the piston 121 moves to a particular axial position determined by a relationship between the fluid force and the biasing force.

At block 608, the method 600 includes, in response to motion of the piston 121 to the particular axial position: (i) opening a main flow path from the third port 116 to the first port 112 while blocking fluid path from the fourth port 119 to the second port 114, and (ii) opening a pilot fluid signal path from the third port 116 to the fourth port 119 to provide a pilot fluid signal to the pilot port of the load-holding valve.

The detailed description above describes various features and operations of the disclosed systems with reference to the accompanying figures. The illustrative implementations described herein are not meant to be limiting. Certain aspects of the disclosed systems can be arranged and combined in a wide variety of different configurations, all of which are contemplated herein.

Further, unless context suggests otherwise, the features illustrated in each of the figures may be used in combination with one another. Thus, the figures should be generally viewed as component aspects of one or more overall implementations, with the understanding that not all illustrated features are necessary for each implementation.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

Further, devices or systems may be used or configured to perform functions presented in the figures. In some instances, components of the devices and/or systems may be configured to perform the functions such that the components are actually configured and structured (with hardware and/or software) to enable such performance. In other examples, components of the devices and/or systems may be arranged to be adapted to, capable of, or suited for performing the functions, such as when operated in a specific manner.

By the term "substantially" or "about" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide The arrangements described herein are for purposes of example only. As such, those skilled in the art will appreciate that other arrangements and other elements (e.g., machines, interfaces, operations, orders, and groupings of operations, etc.) can be used instead, and some elements may be omitted altogether according to the desired results. Further, many of the elements that are described are functional entities that may be implemented as discrete or distributed components or in conjunction with other components, in any suitable combination and location.

While various aspects and implementations have been disclosed herein, other aspects and implementations will be apparent to those skilled in the art. The various aspects and implementations disclosed herein are for purposes of illustration and are not intended to be limiting, with the true scope being indicated by the following claims, along with the full scope of equivalents to which such claims are entitled. Also, the terminology used herein is for the purpose of describing particular implementations only, and is not intended to be limiting.

What is claimed is:

1. A valve comprising:
   a housing comprising: (i) a first port, (ii) a second port, (iii) a third port, wherein the third port comprises a pilot cross-hole and an inlet flow cross-hole, and (iv) a fourth port;
   a piston disposed in the housing and axially movable between a neutral position and an actuated position, wherein in the neutral position, the piston allows the fourth port to be drained to the second port;
   a check poppet disposed in the housing and configured to be coupled to the piston, wherein in the neutral position, the check poppet is seated on a seat formed on an interior peripheral surface of the housing and blocks fluid at the first port;
   a solenoid actuator sleeve comprising a chamber therein, wherein the solenoid actuator sleeve is axially movable between an unactuated state and an actuated state, wherein in the unactuated state, the solenoid actuator sleeve blocks the pilot cross-hole of the third port, and in the actuated state, the solenoid actuator sleeve is configured to allow the pilot cross-hole of the third port to be fluidly coupled to the second port and allow pilot fluid to apply a fluid force on the piston in a distal direction; and
   a feedback spring disposed in the chamber within the solenoid actuator sleeve, wherein the feedback spring applies a biasing force in a proximal direction on the piston against the fluid force, wherein the piston and the check poppet are configured to move axially to the actuated position based on a relationship between the fluid force and the biasing force, and wherein in the actuated position: (i) the check poppet is unseated off the seat to fluidly couple the inlet flow cross-hole of the third port to the first port, and (ii) the piston provides a pilot fluid signal path from the third port to the fourth port.

2. The valve of claim 1, wherein the piston includes a first piston cross-hole and a second piston cross-hole axially-spaced from the first piston cross-hole, wherein the first piston cross-hole is fluidly coupled to the fourth port, and wherein in the actuated position, the second piston cross-hole becomes fluidly coupled to the third port and provides a path for fluid to the first port therethrough.

3. The valve of claim 2, wherein in the actuated position, the pilot fluid signal path comprises the inlet flow cross-hole, the second piston cross-hole, a main chamber within the piston, and the first piston cross-hole.

4. The valve of claim 1, wherein the piston comprises a proximal piston portion disposed within the chamber of the solenoid actuator sleeve, and wherein the feedback spring applies the biasing force in the proximal direction on the proximal piston portion of the piston.

5. The valve of claim 4, further comprising:
   a spring cap coupled to the proximal piston portion, wherein a proximal end of the feedback spring rests against the spring cap, whereas a distal end of the feedback spring rests against an interior surface of the solenoid actuator sleeve.

6. The valve of claim 1, further comprising:
   a pilot chamber formed within the housing between the solenoid actuator sleeve and the piston, wherein when the solenoid actuator sleeve is in the actuated state, the pilot fluid is communicated from the pilot cross-hole to the pilot chamber to apply the fluid force on the piston in the distal direction.

7. The valve of claim 6, wherein the piston comprises an orifice and a longitudinal channel formed therein, wherein as the solenoid actuator sleeve moves axially to the actuated state, a pilot flow path is formed to allow pilot fluid flow from the third port through the pilot cross-hole, the pilot chamber, the longitudinal channel, and the orifice to the second port.

8. The valve of claim 1, wherein the check poppet comprises a pin portion extending through a main chamber formed within the piston, wherein the pin portion of the check poppet has a spherical tip, and wherein the piston includes a spherical cavity configured to receive the spherical tip of the pin portion to couple the piston to the check poppet.

9. The valve of claim 1, further comprising:
   a return spring disposed within the housing and configured to apply a respective biasing force on the check poppet and the piston in the proximal direction toward the neutral position, wherein the actuated position of the piston is an equilibrium position that is based on a respective relationship between: (i) the fluid force acting on the piston in the distal direction, and (ii) the respective biasing force of the return spring and the biasing force of the feedback spring acting on the piston in the proximal direction.

10. The valve of claim 1, further comprising:
    a solenoid actuator comprising a solenoid coil, a pole piece, and an armature that is mechanically coupled to the solenoid actuator sleeve, wherein when the solenoid coil is energized, the armature and the solenoid actuator sleeve coupled thereto move axially in the proximal direction toward the pole piece, thereby compressing the feedback spring.

11. The valve of claim 10, wherein the solenoid actuator further comprises a solenoid tube, and wherein the solenoid tube comprises: (i) a cylindrical body, (ii) a first chamber defined within the cylindrical body and configured to receive the armature of the solenoid actuator therein, and (iii) a second chamber defined within the cylindrical body, wherein the pole piece is formed as a protrusion within the cylindrical body, wherein the pole piece is disposed between the first chamber and the second chamber, and wherein the pole piece defines a channel therethrough, such that the channel of the pole piece fluidly couples the first chamber to the second chamber.

12. The valve of claim 11, further comprising:
    a manual override actuator having: (i) a manual override piston disposed, at least partially, in the second chamber of the solenoid tube, and (ii) a pin disposed through the channel of the pole piece and through the armature, wherein a proximal end of the pin is configured to contact the manual override piston and a distal end of the pin is coupled to the piston, wherein axial motion of the manual override piston causes the pin and the piston to move axially, thereby manually moving the piston to the actuated position.

13. The valve of claim 1, wherein the check poppet includes one or more check cross-holes, and wherein in the actuated position as the check poppet moves off the seat, a flow area is formed between the check poppet and the housing to allow fluid to flow from the third port through the flow area, then through the one or more check cross-holes to the first port.

14. A hydraulic system comprising:
a source of fluid;
a tank;
an actuator having a first actuator port and a second actuator port;
a load-holding valve having: (i) a load port fluidly coupled to the second actuator port, and (ii) a pilot port, wherein the load-holding valve is configured to allow fluid flow from the load port to the tank when a pilot fluid signal is provided to the pilot port; and
a valve having (i) a first port fluidly coupled to the first actuator port, (ii) a second port fluidly coupled to the tank, (iii) a third port fluidly coupled to the source of fluid, wherein the third port comprises a pilot cross-hole and an inlet flow cross-hole, and (iv) a fourth port fluidly coupled to the pilot port of the load-holding valve, and wherein the valve comprises:
a piston that is axially movable between a neutral position and an actuated position, wherein in the neutral position, the piston allows the fourth port to be drained to the second port,
a check poppet configured to be coupled to the piston, wherein in the neutral position, the check poppet is seated on a seat formed on an interior peripheral surface of a housing of the valve and blocks fluid at the first port of the valve,
a solenoid actuator sleeve comprising a chamber therein, wherein the solenoid actuator sleeve is axially movable between an unactuated state and an actuated state, wherein in the unactuated state, the solenoid actuator sleeve blocks the pilot cross-hole of the third port, and in the actuated state, the solenoid actuator sleeve is configured to allow the pilot cross-hole of the third port to be fluidly coupled to the second port and allow pilot fluid to apply a fluid force on the piston in a distal direction, and
a feedback spring disposed in the chamber within the solenoid actuator sleeve, wherein the feedback spring applies a biasing force in a proximal direction on the piston against the fluid force, wherein the piston and the check poppet are configured to move axially to the actuated position based on a relationship between the fluid force and the biasing force, and wherein in the actuated position: (i) the check poppet is unseated off the seat to form a main flow path that fluidly couples the inlet flow cross-hole of the third port to the first port and provide main flow to the first actuator port, and (ii) the piston provides a pilot fluid signal path for the pilot fluid signal from the third port to the fourth port, which is fluidly coupled to the pilot port of the load-holding valve, to actuate the load-holding valve.

15. The hydraulic system of claim 14, wherein the valve is a first valve, wherein the load-holding valve is a first counterbalance valve, and wherein the hydraulic system further comprises:
a second counterbalance valve having: (i) a respective load port fluidly coupled to the first actuator port, and (ii) a respective pilot port; and
a second valve having (i) a respective first port fluidly coupled to the second actuator port, (ii) a respective second port fluidly coupled to the tank, (iii) a respective third port fluidly coupled to the source of fluid, and (iv) a respective fourth port fluidly coupled to the respective pilot port of the second counterbalance valve.

16. The hydraulic system of claim 15, wherein:
when the first valve is actuated and the second valve is unactuated, the first valve provides the pilot fluid signal to actuate the first counterbalance valve, whereas the second valve fluidly couples the respective pilot port of the second counterbalance valve to the tank, and
when the second valve is actuated and the first valve is unactuated, the second valve provides a respective pilot fluid signal to actuate the second counterbalance valve, whereas the first valve fluidly couples the pilot port of the first counterbalance valve to the tank.

17. The hydraulic system of claim 14, wherein the load-holding valve comprises a free-flow check valve configured to allow fluid flow from the tank to second actuator port when pressure level at the second actuator port is below a threshold pressure value.

18. A method comprising:
operating a valve in a first state, wherein the valve comprises a first port configured to be fluidly coupled to an actuator, a second port configured to be fluidly coupled to a tank, a third port configured to be fluidly coupled to a source of fluid, and a fourth port configured to be fluidly coupled to a pilot port of a load-holding valve, wherein in the first state of the valve, the fourth port is fluidly coupled to the second port to drain the pilot port of the load-holding valve to the tank;
receiving an electric signal energizing a solenoid coil of a solenoid actuator of the valve to operate the valve in a second state;
responsively, causing an armature and a solenoid actuator sleeve coupled thereto to move, thereby (i) compressing a feedback spring to increase a biasing force applied by the feedback spring on a piston of the valve in a proximal direction, and (ii) opening a pilot flow path to allow pilot fluid to flow from the third port to the second port, wherein the pilot fluid applies a fluid force on the piston in a distal direction, and wherein the piston moves to a particular axial position determined by a relationship between the fluid force and the biasing force; and
in response to motion of the piston to the particular axial position: (i) opening a main flow path from the third port to the first port while blocking fluid path from the fourth port to the second port, and (ii) opening a pilot fluid signal path from the third port to the fourth port to provide a pilot fluid signal to the pilot port of the load-holding valve.

19. The method of claim 18, wherein the valve further comprises a check poppet configured to be coupled to the piston, wherein in the first state, the check poppet is seated on a seat formed on an interior peripheral surface of a housing of the valve and blocks fluid at the first port of the valve, and wherein opening the main flow path from the third port to the first port comprises:
moving the check poppet off the seat to form a flow area between the check poppet and the housing to allow fluid to flow from the third port through the flow area, then to the first port.

20. The method of claim 18, wherein the valve comprises:
a manual override actuator having a manual override piston and a pin, wherein a proximal end of the pin contacts the manual override piston and a distal end of the pin is coupled to the piston of the valve, the method further comprising:
  moving the manual override piston axially, thereby causing the pin and the piston to move axially, thereby opening the main flow path.

* * * * *